Aug. 1, 1939.  W. S. DIEHL  2,167,644
AMPHIBIAN HULL RESILIENT STEP
Filed Dec. 4, 1937
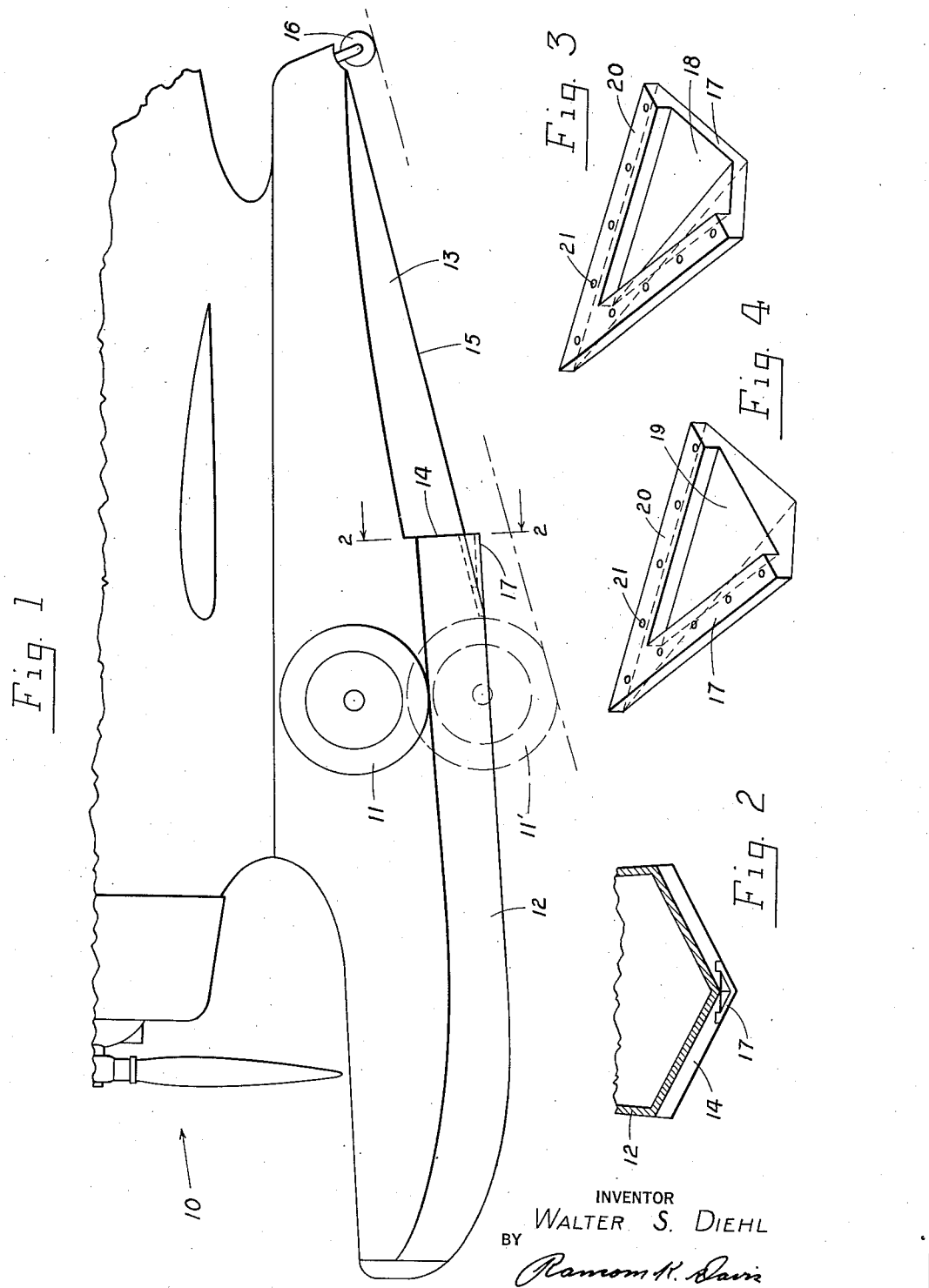
INVENTOR
WALTER S. DIEHL
BY
Ramom K. Davis
ATTORNEY Patented Aug. 1, 1939

2,167,644

UNITED STATES PATENT OFFICE 2,167,644

AMPHIBIAN HULL RESILIENT STEP

Walter S. Diehl, United States Navy

Application December 4, 1937, Serial No. 178,094

3 Claims. (Cl. 114—66.5)

(Granted under the act of March 3, 1883, as amended April 30, 1928; 370 O. G. 757)

This invention relates to the step on the hull of an amphibian aircraft, and has for an object to provide a hull step which will permit improved ground clearance when the aircraft is taking off from the ground, yet at the same time, will not have any deleterious effect when taking off from the water.

In seaplanes, a step is generally provided in the hull or float between the main hull portion and the after keel, as its absence often produces a very adverse performance, increasing the resistance, the spray, and, in some cases, making the aircraft dangerously unstable on the water. In the case of an amphibian plane, the step is just as essential for water performance, yet its absence is often essential for improved ground clearance for land take offs.

It is an object of this invention to make a sufficient part of the step position of a resilient material, which will be of sufficient resiliency that it will not interfere with a take off from the ground, and of a sufficient stiffness that it will properly assist in a take off from the water.

With the foregoing and other objects in view, the invention consists in the construction, combination and arrangement of parts hereinafter described and illustrated in the drawing, in which:

Fig. 1 is a side, fragmentary, elevational view of an amphibian aircraft to which this invention has been applied.

Fig. 2 is a sectional view on line 2—2 of Fig. 1.

Fig. 3 is a perspective view of the resilient step of Fig. 2, and

Fig. 4 is a perspective view of another form of resilient step.

There is shown at 10 an amphibian aircraft provided with its usual retractible ground landing and take off wheels 11 and the usual water landing and take off hull 12, with its after keel portion 13 joined thereto by the step 14. In order to facilitate take off from the ground, it has been found desirable, and sometimes necessary, to remove a tetrahedron defined by a plane extending through step 14 parallel to the keel line 15 and equidistant from the opposite sides of the keel 13. With such tetrahedron removed, the amphibian aircraft can take off much easier when it is supported on the wheels 11 in position 11' and the tail wheel 16 at the beginning of the take off run. When the same tetrahedron is missing when the take off is from the water surface, the efficiency of the take off is greatly diminished, and even dangerous under certain conditions.

After removing this tetrahedron, this invention replaces it with a tetrahedron 17 made of a resilient and yieldable material, such as rubber, which may be made in the same manner as a vehicle wheel tire tread, and if necessary, may be internally reinforced with fabric in the same manner.

This resilient tetrahedron 17 may have its upper side cut away as at 18 in Fig. 3, thereby providing an indented V on its upper side, or it may be left uncut in the same plane as at 19 in Fig. 4. Flanges 20 are provided along the top forward edges of the tetrahedron 17, through which bolt or screw holes 21 extend to provide attaching means, the bottom of the hull 12 being suitably countersunk to receive the flanges. Alternatively, any other securing means may be provided, such as cementing or gluing the tetrahedron 17 in position.

In operation, the resilient tetrahedron 17 is permanently, yet removably, secured in position on the step 14, being replaceable if it should be damaged in use. In taking off from the water the resilient tetrahedron 17 has sufficient stiffness to produce the same effect as though it were as inflexible as the original material of the step 14. In taking off from the land the resilient tetrahedron 17 will yield easily if it strikes an irregularity in the ground, and not interfere with the travel of the amphibian over the ground preparatory to taking off.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. In an amphibian aircraft V-shaped hull having a main step dividing its keel into a forward keel and an after keel, a resilient member located at the keel line of said step, said resilient member being in the form of a tetrahedron defined by a plane extending parallel to the keel line of the after keel and equidistant from the V sides of the after keel.

2. In an amphibian aircraft V-shaped hull having a main step dividing its keel into a forward keel and an after keel, a resilient member located at the keel line of said step, said resilient member being substantially in the form of a tetrahedron defined by a plane extending parallel to the keel line of the after keel and equidistant from the sides of the after keel, and an attaching flange secured to the upper edges of the tetrahedron and adapted to be countersunk into the hull.

3. An amphibian aircraft V-shaped hull having a main step dividing its keel into a forward keel and an after keel, a portion of said main step comprising a resilient yieldable rubber block countersunk within said forward keel at said main step and having its outer surface coinciding with the normal outer surface of said forward keel and step.

WALTER S. DIEHL.